United States Patent
Bilsing

(10) Patent No.: US 6,841,901 B2
(45) Date of Patent: Jan. 11, 2005

(54) ELECTRIC MACHINE

(75) Inventor: Thomas Bilsing, Boennigheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/469,461

(22) PCT Filed: Feb. 14, 2002

(86) PCT No.: PCT/DE02/00518
§ 371 (c)(1),
(2), (4) Date: Feb. 5, 2004

(87) PCT Pub. No.: WO02/071576
PCT Pub. Date: Sep. 12, 2002

(65) Prior Publication Data
US 2004/0108775 A1 Jun. 10, 2004

(30) Foreign Application Priority Data

Mar. 2, 2001 (DE) ......................................... 101 10 129

(51) Int. Cl.7 .............................................. H02K 9/00
(52) U.S. Cl. .............................. 310/62; 310/63; 310/64
(58) Field of Search ............................. 310/58, 62, 63, 310/64, 263, 52, 59, 60 R

(56) References Cited

U.S. PATENT DOCUMENTS

| | | | |
|---|---|---|---|
| 3,431,978 A | 3/1969 | Papst | 416/43 R |
| 4,588,911 A * | 5/1986 | Gold | 310/62 |
| 5,241,230 A * | 8/1993 | Tanaka et al. | 310/62 |
| 5,940,268 A * | 8/1999 | Miyahara et al. | 361/697 |
| 6,297,571 B1 * | 10/2001 | Knappenberger | 310/60 R |
| 6,307,289 B1 | 10/2001 | Skala | 370/68 D |
| 6,448,687 B2 * | 9/2002 | Higashino et al. | 310/263 |
| 6,455,958 B1 * | 9/2002 | Asao et al. | 310/51 |

FOREIGN PATENT DOCUMENTS

| | | |
|---|---|---|
| DE | 1 628 349 | 5/1971 |
| DE | 2 626 539 | 12/1977 |
| DE | 26 26 539 | 12/1977 |
| DE | 30 38 031 A1 | 4/1981 |
| DE | 42 38 999 C | 5/1994 |
| DE | 44 01 625 A1 | 3/1995 |
| DE | 93 14 985.9 | 3/1995 |
| DE | 198 28 518 A | 12/1999 |
| DE | 696 06 949 T2 | 8/2000 |
| EP | 0 420 371 A1 | 4/1991 |
| GB | 2 273 208 | 6/1994 |

OTHER PUBLICATIONS

Patent Abstracts of Japan vol. 016, No. 344 (E–1239), Jul. 24, 1992 & JP 04 105533 A, Apr. 7, 1992.
Patent Abstract of Japan 04105533 A, Apr. 7, 1992.

* cited by examiner

Primary Examiner—Dang Le
(74) Attorney, Agent, or Firm—Michael J. Striker

(57) ABSTRACT

In the case of an electrical machine, in particular an alternator for a motor vehicle, having a housing (2), a rotor (6) that is supported in the housing (2) in a manner that allows it to rotate around an axis of rotation (5) and that has at least one rotor winding (14) and at least one fan wheel (21) mounted on the rotor (6) for generating convection in the housing (2) and for dissipating heat from the at least one rotor winding (14), the at least one fan wheel (21) is joined with the rotor (6) at least in a linear manner in order to better cool the rotor (6).

23 Claims, 3 Drawing Sheets

ELECTRIC MACHINE

BACKGROUND OF THE INVENTION

The present invention relates to an electrical machine, in particular, an alternator for a motor vehicle.

A generic alternator having a rotor is made known in German Patent 198 28 518, on which said rotor two fan wheels are mounted for cooling. The drive-end fan wheel is located directly on the end face of a claw-pole plate. Typically, fan wheels made of sheet steel are used, the fan wheels being mounted on the claw pole using spot or projection welding. These welded joints have the disadvantage that efficient heat dissipation from the claw pole via the fan wheels to the cooling air cannot take place, because there is high thermal resistance between the fan wheel and the claw pole.

SUMMARY OF THE INVENTION

Based on this, the invention is based on the object of configuring an alternator of the generic type in such a manner that heat dissipation is improved.

As a result of this configuration, heat conduction is improved dramatically due to the larger transitional area from the rotor via the fan wheel to the cooling air. As a result, the temperatures in the excitation winding as well as the temperatures in the region of the pole fingers are reduced, which allows a performance advantage of the alternator to be attained. The surface of the rotor around the surface of the fan wheel is therefore enlarged, which allows greater heat dissipation to be achieved.

In a further embodiment of the invention, it is advantageously provided that at least one fan wheel and the rotor are joined over a large area using welding. Welding ensures that the fan wheel is joined to the rotor in an economical, secure manner having good heat conduction.

It is also advantageous that the at least one fan wheel and the rotor are joined at least along an arc, whereby a two-dimensional configuration of the connection is also possible. The fan wheel is therefore mounted on the rotor via a large area, in order to reduce thermal resistance. Better cooling of the rotor is enabled by increasing the size of the cross-sectional area for heat conduction.

The at least one fan wheel and the rotor are preferably joined using ultrasonic welding. With ultrasonic welding, the welded surface and, therefore, the thermal contact area between fan wheel and rotor can be markedly increased compared to other welding methods, with lower costs.

According to an advantageous embodiment, the at least one fan wheel is made of an aluminum alloy. The use of fan wheels made of an aluminum alloy has the advantage that heat conduction in the fan wheel is improved considerably compared to fan wheels made of sheet steel. This is due to the higher thermal conductivity coefficients. Moreover, the material combination of aluminum and steel makes ultrasonic welding possible. Additionally, the use of fan wheels made of an aluminum alloy causes the magnetic leakage flux between the two claw poles to be suppressed by the non-magnetic fan wheel.

It is also advantageous that a fan wheel is provided on each of the diametrically opposed end faces of the rotor. Positioning the fan wheels on both sides effects efficient cooling of the rotor.

BRIEF DESCRIPTION OF THE DRAWINGS

The invention will be described in greater detail hereinbelow with reference to a preferred exemplary embodiment in conjunction with the drawing.

DETAILED DESCRIPTION OF THE PREFERRED EMBODIMENTS

Figure 1:
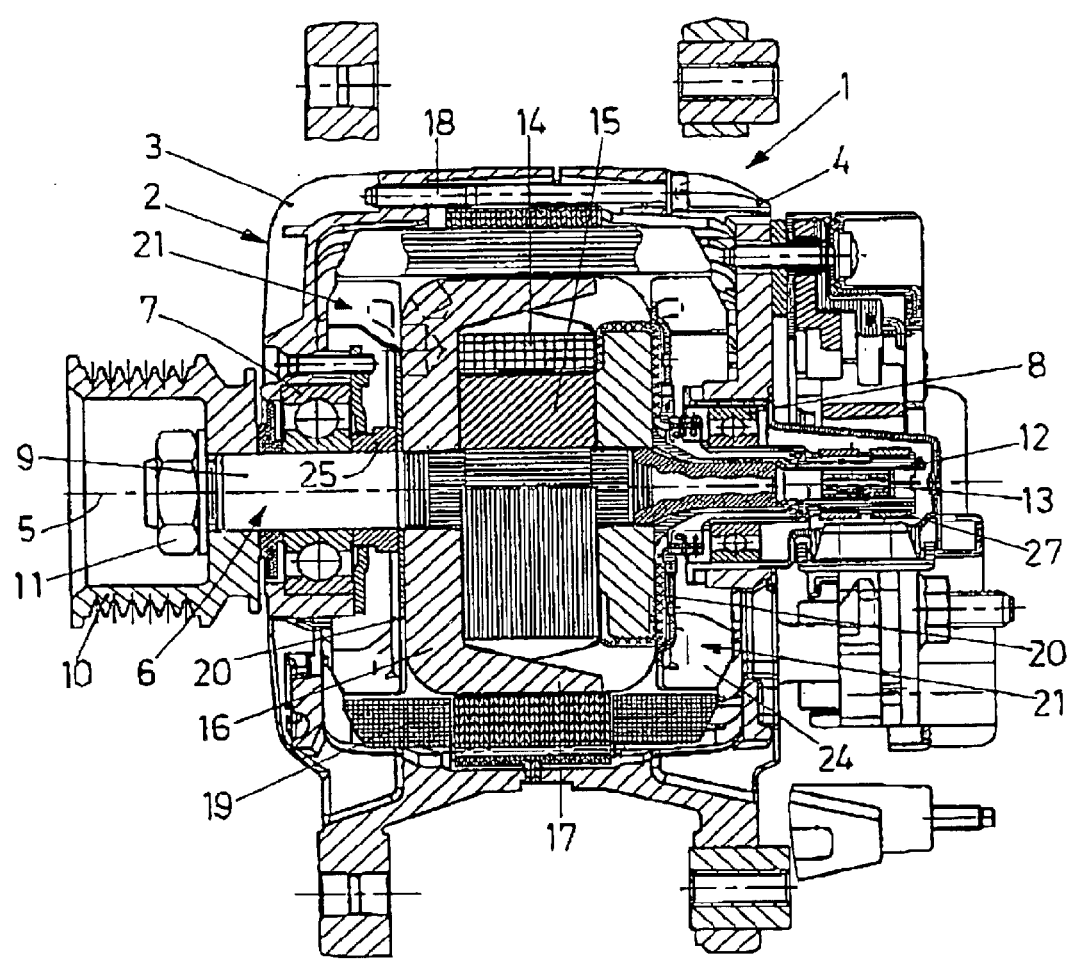
FIG. 1 is a longitudinal sectional drawing of an alternator with fan wheels on both sides.
Figure 2:
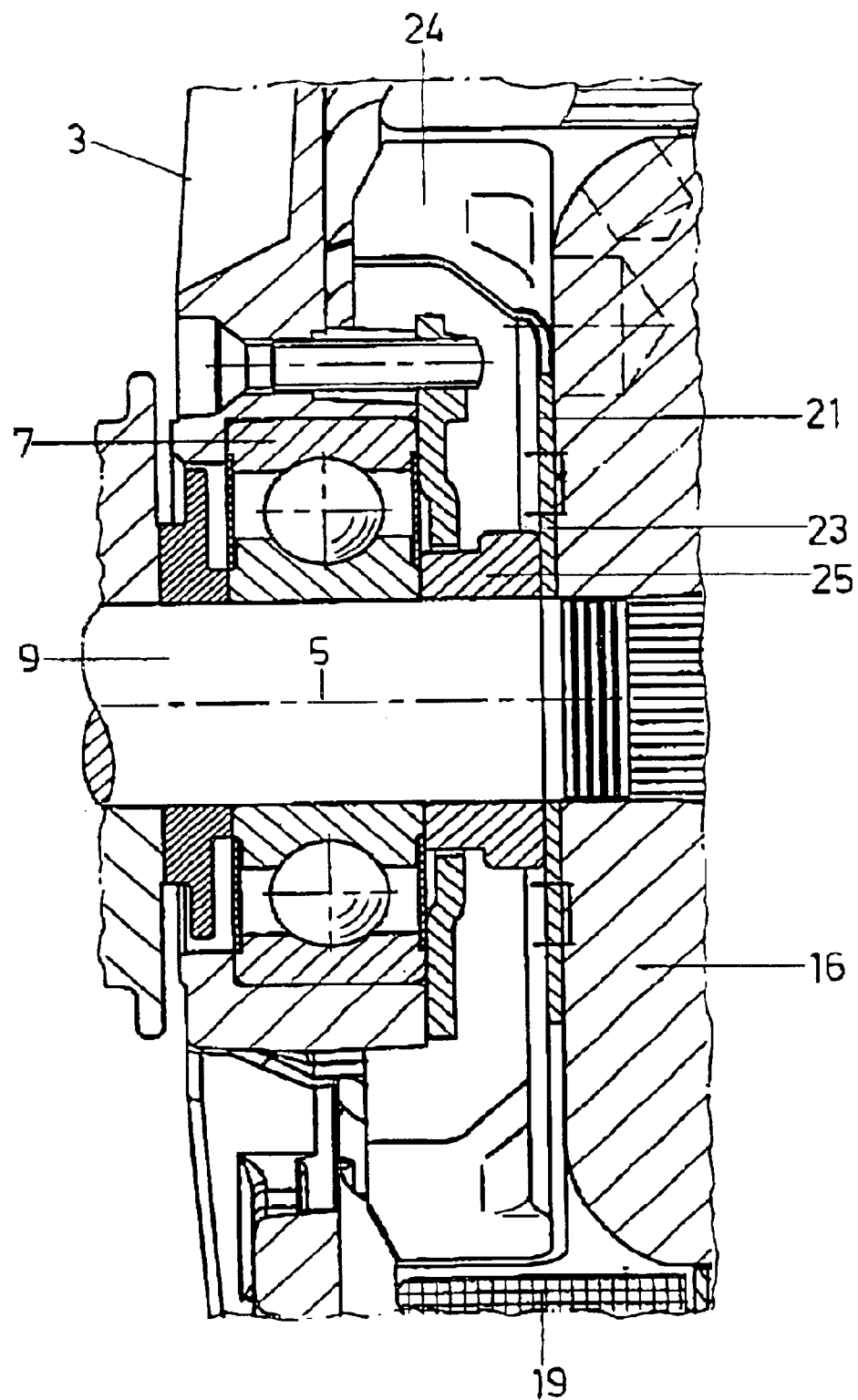
FIG. 2 is an enlarged section of the view according to FIG. 1 of the drive-end fan wheel.
Figure 3:
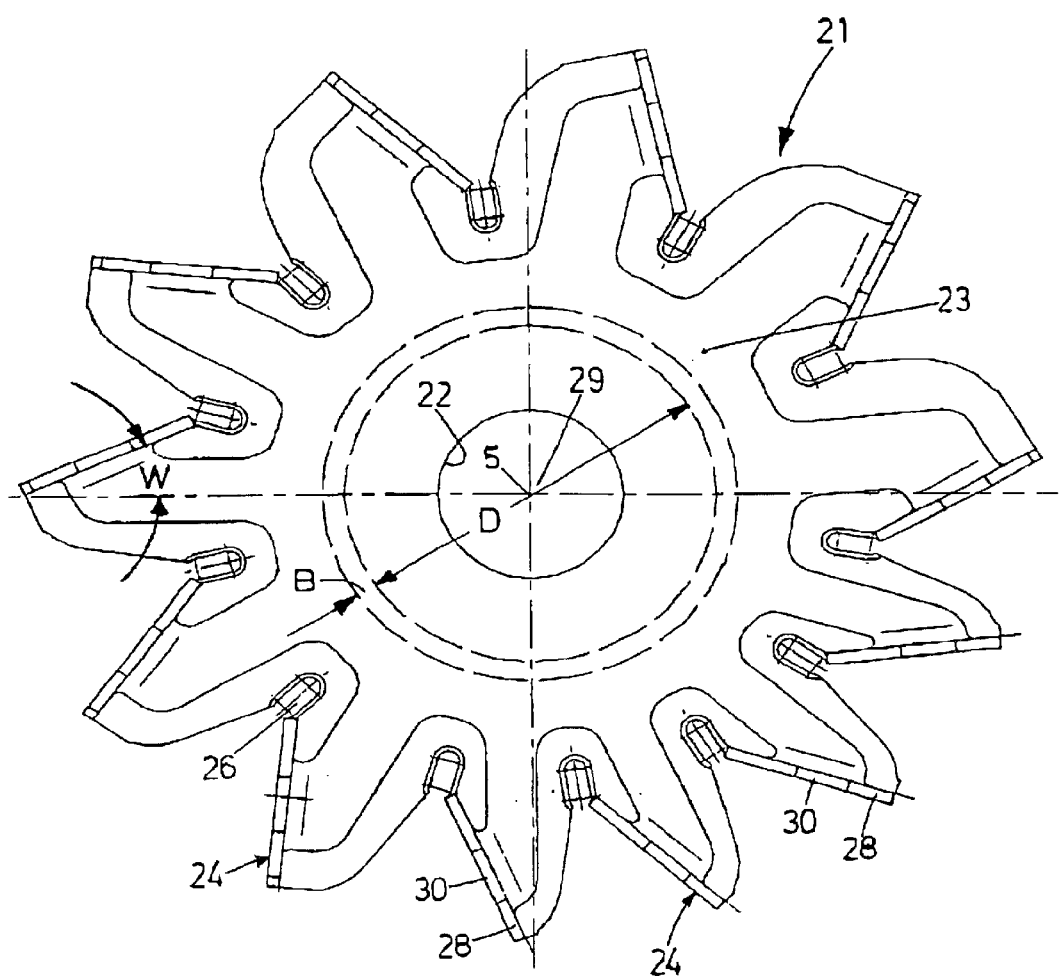
FIG. 3 is a top view of a fan wheel.

An electrical machine, a generator 1 in this exemplary embodiment, has a rotor 6 that is supported—in a manner that allows it to rotate around an axis of rotation 5—in a housing 2 made of two housing halves 3 and 4. A three-part housing 2 is also possible. Rotor 6 is supported by two roller bearings, whereby roller bearing 7 in front housing half 3 is larger and is configured as a fixed bearing. Roller bearing 8 is located in rear housing half 4 and forms the movable bearing. Front housing half 3 is configured as an end shield for roller bearing 7 and housing half 4 is configured as an end shield for roller bearing 8. A pulley 10, secured with a bolt 11, is mounted on the outside of housing half 3 on the end of rotor shaft 9 to drive the rotor 6. A collector-ring arrangement 12 is provided at the rear end of rotor shaft 9. Collector-ring arrangement 12 encloses carbon brushes 13 on the rotor shaft 9. Carbon brushes 13 interact with collector rings 27 in known fashion. An embodiment without collector rings or brushes is also possible. Rotor 6 includes, in the center region on rotor shaft 9, a rotor winding 14 on a core piece 15, said rotor winding corresponding to an excitation winding, and two claw-pole plates 16 directly adjacent to rotor winding 14, said claw-pole plates having intermeshing claw-pole fingers 17. The two housing halves 3 and 4, joined with each other via screws 18, fix a stator winding 19 in position that encircles the periphery of the inside of the housing.

Fan wheels 21 made of an aluminum alloy are located on rotor shaft 9 on the external end faces 20 of claw-pole plates 16. Fan wheels 21 have a central bore 22 that allows them to be slid onto rotor shaft 9. The end faces 20 of claw-pole plates 16 are then ultrasonically welded with fan plate 23 of fan wheel 21. The fan wheels 21 have individual, radially projecting fan vanes 24 in the outer region. Fan vane 24 has an axially oriented, projecting fan blade 28, whereby fan vane 24 and fan blade 28 are configured as a single component. Fan vane 24 is tilted at an angle W relative to bore axis 29. Angle W is preferably 25°. Fan blade 28 has a recess 30 on its end face. As an alternative, fan wheels 21 made of steel can be used. When using fan wheels 21 made of steel, laser welding is required. The use of aluminum-alloy fan wheels 21 is preferred, since aluminum has a higher thermal conductivity coefficient and prevents magnetic leakage flux between the claw poles by the non-magnetic fan wheel 21. The welding takes place in a region concentric with shaft axis 5, having an internal diameter D and a width B. The weld is configured annular in shape in this region.

In this exemplary embodiment, the annular surface of the weld is 706.9 mm$^2$ for each fan wheel, whereby an internal diameter of 40 mm and an annular width of 5 mm are used as the basis. Other types of connections are also possible. Good conductivity is the basis for a connection. As an alternative, soldered joints or bonded joints, for example, may be used. The connection between fan wheel 21 and rotor 6 can also take place on an arc. A square configuration of the connecting surface is also possible.

A spacer 25 is located on rotor shaft 9 between fan wheel 21 in the front housing half 3 and drive-end roller bearing 7. Moreover, fan wheel 21 in housing half 3 is equipped with recesses 26 on the end of fan plate 23 for attachment to the external end faces 20 of claw-pole plates 16.

The operating method of the alternator according to the present invention is identical to the operating method of known alternators. The flowing currents in stator winding 19 and rotor winding 14 cause a great deal of heat to form in the housing 2 of alternator 1. With known alternators, a current of air is drawn in axially through slits in the housing for cooling and then blown radially outwardly at the front winding head of the stator winding through external housing slits. With known alternators, therefore, cooling using fan wheels takes place via the intake of cooling air and via the removal of heat that is produced.

With known alternators, the fan wheels are mounted on the claw pole end faces using spot or projection welding. With alternators having two fan wheels, the related art shows that typically only the collector ring-side fans are mounted on the claw-pole plates. This mounting usually takes place using 12 welding points, each having a diameter of 5 mm. This results in a total welding area of 235.6 mm². This small area causes high thermal resistance between fan and claw pole. In comparison with alternator 1 according to the present invention, the connecting surface is configured smaller by a factor of 6.

As an alternative, a weld having a large surface is possible with electrical machines having other types of pole configurations. Fan wheel 21 can also be located between claw-pole plates 16, whereby fan wheel 21 is then welded with the inside of claw-pole plate 16.

Due to the large-size configuration of the welding surface between claw-pole plate 16 and fan wheel 21, heat conduction from rotor 6 via fan wheel 21 to the cooling air is improved considerably with alternator 1 according to the present invention. For this reason, this connection is configured with good heat conduction. Due to the temperature reduction in rotor winding 14, a performance advantage of alternator 1 can be attained. The problematic expansion of claw-pole fingers 17 as a result of high operating speeds of the rotor is also positively influenced by the low temperature, since the elasticity module of the pole finger material is temperature-dependent.

What is claimed is:

1. An electrical machine, in particular an alternator for a motor vehicle, comprising:
    a housing (2);
    a rotor (6) that is supported in the housing (2) in a manner that allows it to rotate around an axis of rotation (5), said rotor (6) having at least one rotor winding (14);
    at least one fan wheel (21) mounted on the rotor (6) for generating convection in the housing (2) and for dissipating heat from the at least one rotor winding (14),
    the at least one fan wheel (21) and the rotor (6) are joined using welding at least along an arc in order to direct heat away from the rotor (6) to the fan wheel (21).

2. The electrical machine as recited in claim 1, wherein the rotor (6) has two diametrically opposed end faces (20), and the fan wheel (21) is mounted on the end face of the rotor (6).

3. The electrical machine as recited in claim 1, wherein the at least one fan wheel (21) and the rotor (6) are joined in two dimensions.

4. The electrical machine as recited in claim 1, wherein the at least one fan wheel (21) and the rotor (6) are joined using ultrasonic welding.

5. The electrical machine as recited in claim 4, wherein the at least one fan wheel (21) is made of aluminum alloy.

6. The electrical machine as recited in claim 1, wherein the at least one fan wheel (21) joined with the rotor (6) using laser welding.

7. The electrical machine as recited in claim 1, wherein the at least one fan wheel (21) and the rotor (6) are joined along an annular region.

8. The electrical machine as recited in claim 1, wherein a fan wheel (21) is provided on each of the diametrically opposed end faces (20) of the rotor (6).

9. The electrical machine as recited in claim 1, wherein the connection between the at least one fan wheel (21) and the rotor (6) is configured with exceptional heat conduction.

10. An electrical machine in the form of an alternator for a motor vehicle, comprising:
    a housing (2);
    a rotor (6) that is supported in the housing (2) in a manner that allowed the rotor to rotate around an axis of rotation (5), said rotor (6) having at least one rotor winding (14);
    at least one fan wheel (21) mounted on the rotor (6) for generating convection in the housing (2) and for dissipating heat from the at least one rotor winding (14),
    wherein the at least one fan wheel (21) and the rotor (6) are joined using welding along an annular region concentric with the axis of rotation (5) in order to direct heat away from the rotor (6) to the fan wheel (21).

11. The electrical machine as recited in claim 10, wherein the rotor has two diametrically opposed end faces (20), and the fan wheel (21) is mounted on the end face of the rotor (6).

12. The electrical machine as recited in claim 10, wherein the at least one fan wheel (21) and the rotor (6) are joined in two dimensions.

13. The electrical machine as recited in claim 10, wherein the at least one fan wheel (21) and the rotor (6) are joined using ultrasonic welding.

14. The electrical machine as recited in claim 13, wherein the at least one fan wheel (21) is made of aluminum alloy.

15. The electrical machine as recited in claim 10, wherein the at least one fan wheel (21) is joined with the rotor (6) using laser welding.

16. The electrical machine as recited in claim 10, wherein a fan wheel (21) is provided on each of the diametrically opposed end faces (20) of the rotor (6).

17. The electrical machine as recited in claim 10, wherein the connection between the at least one fan wheel (21) and the rotor (6) is configured with exceptional heat conduction.

18. An electrical machine in the form of an alternator for a motor vehicle, comprising:
    a housing (2);
    a rotor (6) that is supported in the housing (2) in a manner that allows it to rotate around an axis of rotation (5), said rotor (6) having at least one rotor winding (14);
    at least one fan wheel (21) mounted on the rotor (6) for generating convection in the housing (2) and for dissipating heat from the at least one rotor winding (14),
    wherein the at least one fan wheel (21) and the rotor (6) are joined using welding at least along an arc in order to direct heat away from the rotor (6) to the fan wheel (21),
    wherein the at least one fan wheel (21) is made of an aluminum alloy, and wherein a connection between the at least one fan wheel (21) and the rotor (6) is configured with exceptional conduction.

19. The electrical machine as recited in claim 18, wherein the rotor (6) has two diametrically opposed end faces (20), and the fan wheel (21) is mounted on the end face of the rotor (6).

20. The electrical machine as recited in claim 18, wherein the at least one fan wheel (21) and the rotor (6) are joined in two dimensions.

21. The electrical machine as recited in claim 18, wherein the at least one fan wheel (21) and the rotor (6) are joined using ultrasonic welding.

22. The electrical machine as recited in claim 18, wherein the at least one fan wheel (21) and the rotor (6) are joined along an annular region.

23. The electrical machine as recited in claim 18, wherein a fan wheel (21) is provided on each of the diametrically opposed end faces (20) of the rotor (6).

* * * * *